United States Patent [19]

Umeda

[11] Patent Number: 5,168,670
[45] Date of Patent: Dec. 8, 1992

[54] AUTOMOBILE DOOR

[75] Inventor: Yoshiyuki Umeda, Hamamatsu, Japan

[73] Assignee: Suzuki Motor Corporation, Japan

[21] Appl. No.: 673,014

[22] Filed: Mar. 21, 1991

[30] Foreign Application Priority Data

Jul. 20, 1990 [JP] Japan ............................. 2-77146[U]

[51] Int. Cl.⁵ .............................................. B60J 5/04
[52] U.S. Cl. ...................................................... 49/502
[58] Field of Search ......................... 49/501, 502, 374; 52/213; 296/146

[56] References Cited

U.S. PATENT DOCUMENTS

| | | | |
|---|---|---|---|
| 4,348,046 | 9/1982 | Ohya | 296/201 |
| 4,357,781 | 11/1982 | Ohya et al. | 49/374 X |
| 4,649,668 | 3/1987 | Skillen et al. | 49/502 X |
| 4,651,470 | 3/1987 | Imura et al. | 49/502 |
| 4,709,957 | 12/1987 | Ohya | 49/374 X |

Primary Examiner—Renee S. Luebke
Assistant Examiner—Jerry Redman
Attorney, Agent, or Firm—McGlew and Tuttle

[57] ABSTRACT

An automobile door provided with a fixed partition window glass together with an elevating window glass in a window frame formed with a door outer panel and a door inner panel, wherein a lower edge portion of an inner reinforcement is fixed to an inner surface of the door inner panel, the upper edge portion of the inner reinforcement is divided into a portion which corresponds to the elevating window glass and a portion which corresponds to the partition window glass, the upper end portion of the inner reinforcement which corresponds to the portion of the elevating window glass is fixed to the door inner panel, and the upper end portion of the inner reinforcement which corresponds to the portion of the partition glass is bent and fixed to the door outer panel across the under surface of the partition window glass so as to provide a function of a glass support.

11 Claims, 4 Drawing Sheets

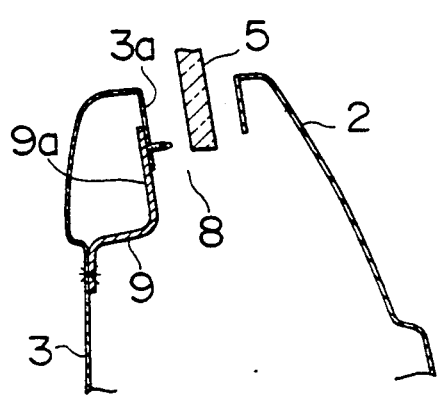
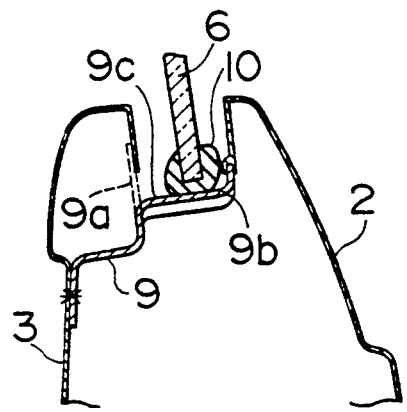
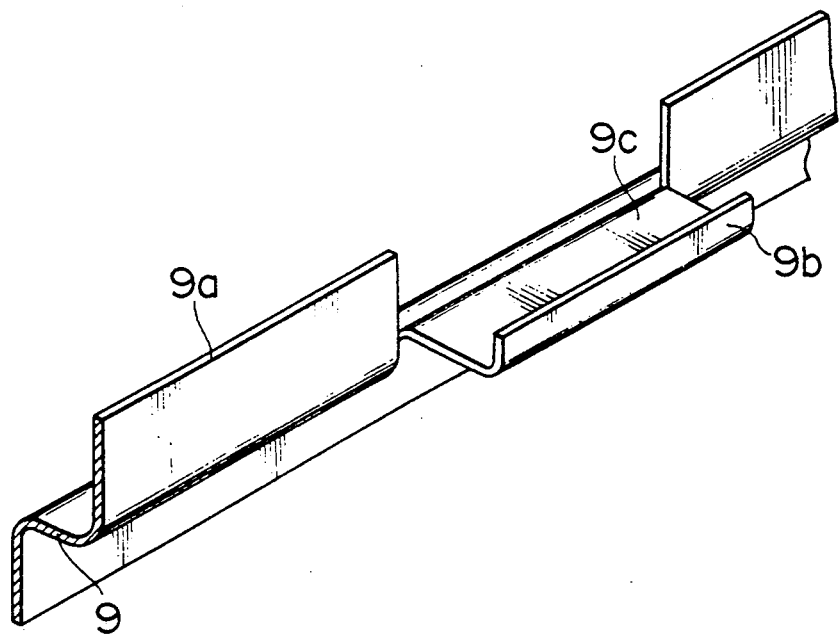

AUTOMOBILE DOOR

FIELD OF THE INVENTION AND RELATED ART STATEMENT

The present invention relates to an automobile door provided with a partition window glass.

In a certain automobile door such as a rear door, a fixed window glass, called a partition window glass 101, is provided at a part of a window other than an elevating window glass 100 as shown in FIG. 5.

In a door of this sort, a clearance gap 104 for housing the elevating window glass 100 and a glass support 105 for supporting the partition window glass 101 are provided between a door outer panel 102 and a door inner panel 103 as shown in FIG. 6. On the other hand, a reinforcement 106 is disposed on an inner surface of the door inner panel 103 in a certain door for the purpose of reinforcing the door.

In above-mentioned prior art, however, the glass support 105 is welded after installing the door outer panel 102 and the door inner panel 103, which results in poor workability. Thereupon, a prior art (Japanese Patent Publication No. HEI 1-46333) in which the glass support is omitted is well known.

In this prior art, a part of the door inner panel 103 is welded to the door outer panel 102, a holder 105 having a channel form in section is disposed in an opening portion 104 between a riser flange 102a of the panel 102 and a riser flange 103a of the panel 103, which is supported directly or indirectly with a deformed portion 103b of the panel 103 so as to form a glass support as shown in FIG. 7 and FIG. 8.

In order to support the holder 105 by means of the door inner panel 103 so as to form a glass support as described above, however, working of the door inner panel 103 becomes complicated, thus requiring the holder 105 and yielding poor workability.

OBJECT AND SUMMARY OF THE INVENTION

It is an object of the present invention which has been made to solve above-described problems to provide an automobile door in which parts cost and assembling man days may be reduced and sufficient rigidity is obtainable.

Essential points of the present invention exist in an automobile door provided with a fixed partition window glass together with an elevating window glass in a window frame formed with a door outer panel and a door inner panel. At lower edge portion of an inner reinforcement is fixed to an inner surface of the door inner panel, the upper edge portion of the inner reinforcement is divided into a portion which corresponds to the elevating window glass and a portion which corresponds to the partition window glass, The upper end portion of the inner reinforcement which corresponds to the portion of the elevating window glass is fixed to the door inner panel. The upper end portion of the inner reinforcement which corresponds to the portion of the partition glass is bent and fixed to the door outer panel across the under surface of the partition window glass so as to provide a function of a glass support.

According to the present invention, a function of glass support is provided as part of the inner reinforcement, thereby making it possible to reduce the number of parts. Further, it is possible to fix an inner reinforcement having above-mentioned structure to the door inner panel in advance, thus making assembly work easy. Furthermore, since the door inner panel and the door outer panel are coupled with each other by means of a bent portion of the inner reinforcement, sufficient rigidity is obtainable. Moreover, since only working of the inner reinforcement is required, yield of large-sized parts will never be deteriorated.

BRIEF DESCRIPTION OF THE DRAWINGS

FIG. 2 is a sectional view taken along a line A—A in FIG. 1;

FIG. 3 is a sectional view taken along a line B—B in FIG. 1;

FIG. 4 is a partially enlarged perspective view of a reinforcement of FIG. 1;

DETAILED DESCRIPTION OF PREFERRED EMBODIMENTS

An embodiment of the present invention will be described in detail hereafter with reference to the drawings.

Figure 1:
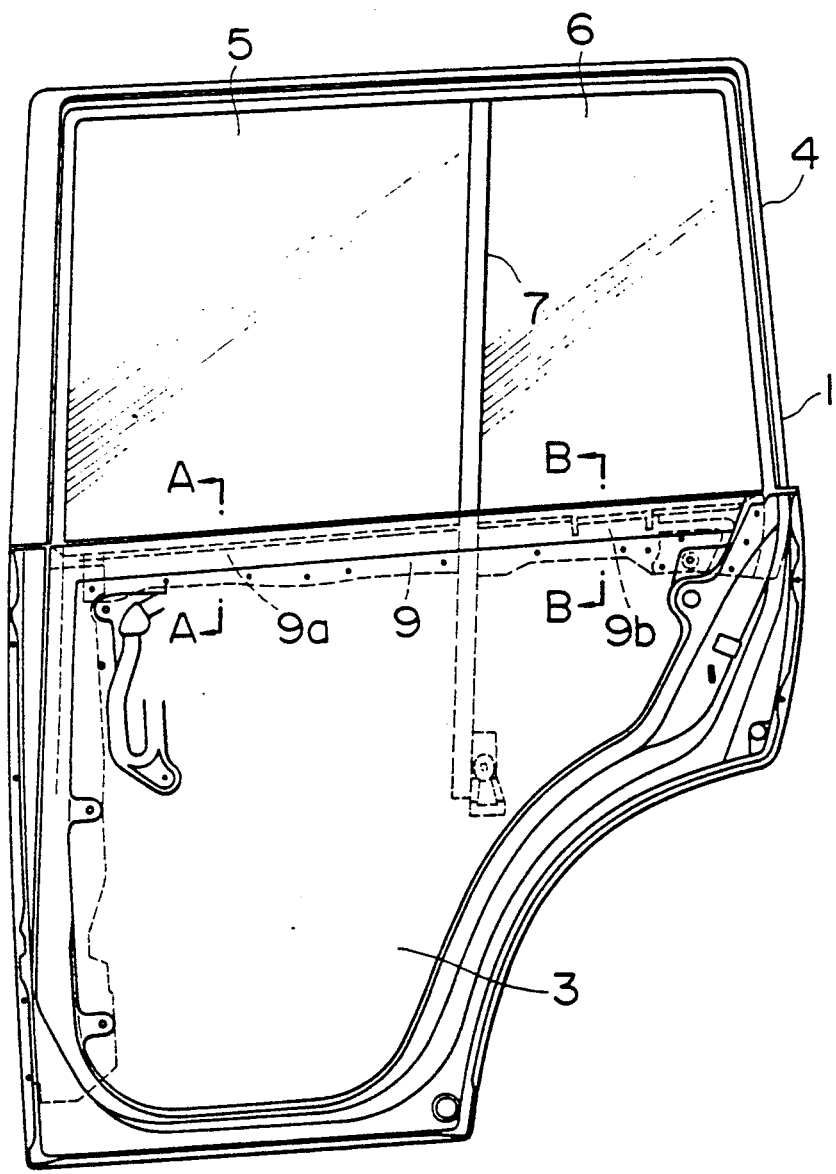
FIG. 1 is a front view showing an embodiment of an automobile door according to the present invention.
Figure 5:
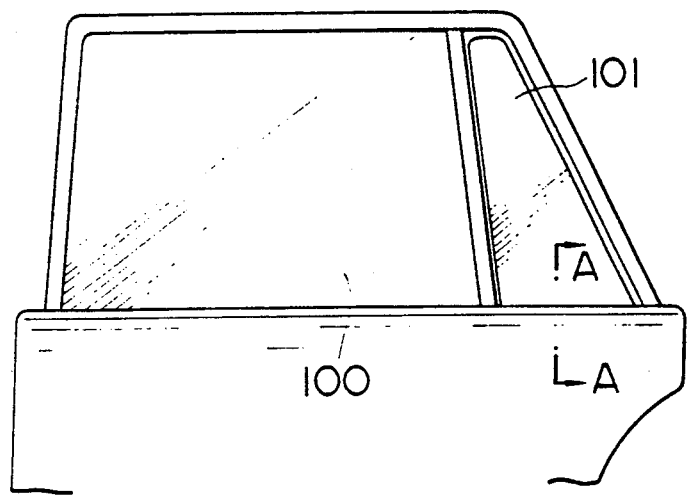
FIG. 5 is a front view showing an automobile door provided with a partition window glass.
Figure 6:
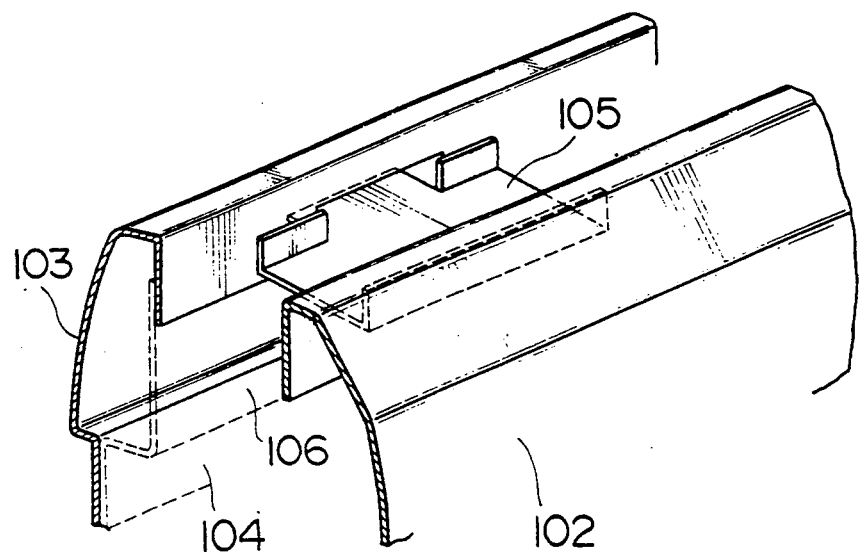
FIG. 6 is a perspective view showing a glass support of a conventional partition window glass.
Figure 7:
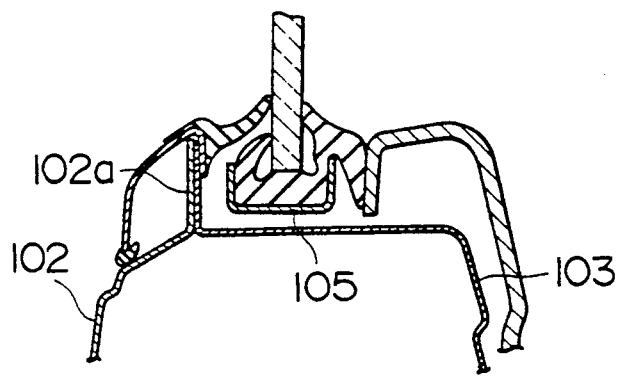
FIG. 7 is a sectional view taken along a line A—A of FIG. 5, which shows another conventional glass support.
Figure 8:
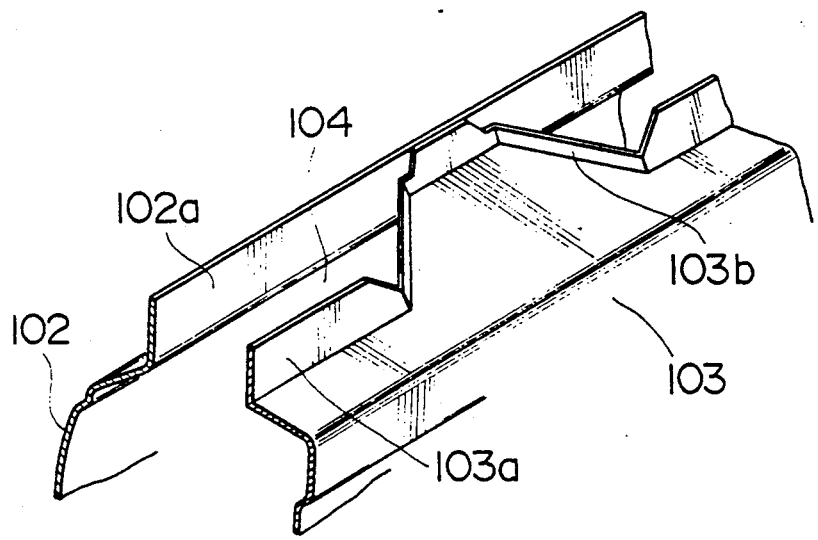
FIG. 8 is a perspective view showing a door outer panel and a door inner panel shown in FIG. 7.

In FIG. 1 thru FIG. 3, a numeral 1 indicates an automobile door in which a fixed partition window glass 6 is set together with an elevating window glass 5 in a window frame 4 formed with a door outer panel 2 and a door inner panel 3. The elevating window glass 5 and the partition window glass 6 are partitioned off each other with a frame 7 provided by dividing the window frame 4 half-way as a border, and the elevating window glass 5 is housed in a clearance gap 8 between the door outer panel 2 and the door inner panel 3.

A numeral 9 indicates an inner reinforcement disposed on an inside surface side at the lower part of the window frame 4 of the door inner panel 3. This inner reinforcement 9 is fitted by welding the lower edge portion thereof over the whole area from the front to the rear of the door inner panel 3. The upper end portion of the inner reinforcement 9 is separated into a portion 9a which corresponds to the elevating window glass 5 and a portion 9b which corresponds to the partition window glass 6. The portion 9a which corresponds to the elevating window glass 5 is welded to a folded portion 3a of the window frame of the door inner panel 3 as shown in FIG. 2. The portion 9b which corresponds to the partition window glass 6 is bent into an L-shape and welded to the door outer panel 2 as shown in FIG. 3 and FIG. 4 so as to be provided with a function of a glass support of the partition window glass 6. The partition window glass 6 is fixed to the glass support portion 9c through a weather strip 10.

According to an automobile door having above-mentioned structure, the lower edge portion of the inner reinforcement 9 is welded to the door inner panel 3, and the portion 9a which corresponds to the elevating window glass 5 of the reinforcement 9 is welded at the upper end thereof to the folded portion 3a of the inner reinforcement 9. Further, the portion 9b which corresponds to the partition window glass 6 of the inner reinforcement 9 is welded to the door outer panel 2 so as to form a glass support. The partition window glass 6 is fixed to this glass support portion 9c.

In above-mentioned automobile door, a part of the inner reinforcement 9 provided on the inside surface of the door inner panel 3 is fixed to the door outer panel 2 through the under surface of the partition window glass 6 so as to provide a function of a glass support. Accordingly, it is possible to omit a conventional glass support thereby to reduce the number of parts. Further, since the inner reinforcement 9 can be fixed to the door inner panel 3 in advance, the assembly work becomes easy. Furthermore, since the door inner panel 3 and the door outer panel 2 are coupled with each other by means of the inner reinforcement 9, sufficient rigidity is obtainable. Moreover, it is not required to work on the door inner panel 3 and the door outer panel 2, but only working of the inner reinforcement 9 is required. Thus, yield of large-sized parts will never be deteriorated. Although the present invention has been explained with respect to above-mentioned embodiment, the present invention is not limited to above-mentioned embodiment, and modification and addition that are self-explanatory to those skilled in the art are all included in the technical scope of the present invention.

What is claimed is:

1. An automobile door comprising:
   an outer panel;
   an inner panel joined to said outer panel;
   an elevating window glass movable through a clearance gap between said outer panel and said inner panel;
   a partition window glass extending outward from a support edge of said outer panel and said inner panel;
   an inner reinforcement having a lower edge portion fixed to a first location on an inner surface of said inner panel, a first upper upright portion welded to a second location, spaced from said first location, on said inner surface of said inner panel, and said inner reinforcement also having a second upper upright portion welded to said outer panel at said support edge, said inner reinforcement forming a partition glass support between said lower edge portion and said second upper upright portion, said partition window glass resting on partition glass support, and said partition glass support providing support to a base of said partition window glass; and
   a weather strip seal engaging a lower end of said partition window glass, said weather strip seal being supported by said second upper upright portion.

2. An automobile door in accordance with claim 1, wherein:
   said lower edge portion is upright and welded to said first location.

3. An automobile door in accordance with claim 1, wherein:
   said inner reinforcement with said lower portion, said first upper upright portion, said second upper upright portion and said partition glass support are formed from a single material.

4. An automobile door in accordance with claim 3, wherein:
   said inner reinforcement is made of flat stock having a first bend to form said lower portion, a second bend to form said first upper upright portion and a third bend to form said second upper upright portion.

5. An automobile door in accordance with claim 4, wherein:
   said third bend forms said second upper upright portion on one side of said third bend and forms said glass support on another side, and a fourth bend separates said partition glass support from said first upper upright portion.

6. An automobile door comprising:
   an outer panel;
   an inner panel;
   an elevating window glass movable through a clearance gap between said outer panel and said inner panel;
   a partition window glass extending outward from a support edge of said outer panel and said inner panel; and
   an inner reinforcement having a lower edge portion fixed to a first location on an inner surface of said inner panel, a first upper portion fastened to a second location, spaced from said first location, on said inner surface of said inner panel, and said inner reinforcement also having a second upper portion fastened to said outer panel, said inner reinforcement forming a partition glass support between said lower portion and said second upper upright portion, said partition window glass resting on partition glass support, and said partition glass support providing support to a base of said partition window glass.

7. An automobile door in accordance with claim 6, wherein:
   said lower edge portion and said first upper portion are directly fastened to said inner surface of said inner panel, and said second upper portion is directly fastened to said outer panel.

8. An automobile door in accordance with claim 6, wherein:
   said lower portion of said inner reinforcement is welded to said inner panel along a length of said elevating window glass and a length of said partition glass.

9. An automobile door in accordance with claim 6, wherein:
   said first upper upright portion is welded to said inner panel along a length of said elevating window glass, and said second upper upright portion is welded to said outer panel along a length of said partition glass.

10. An automobile door comprising:
    an inner panel;
    a partition glass extending from said inner panel;
    an inner reinforcement formed from a single sheet metal material, said single sheet metal material having a lower edge portion welded to said inner panel at a first location, said single sheet metal material having a first upper portion welded to said inner panel at a second location, said second location being spaced from said first location and extending along said inner panel for an elevating window glass length, said inner reinforcement having a first bend in said single sheet metal material forming a partition glass support means for supporting said partition glass, said first bend in said single sheet metal material being between said partition glass resting on partition glass support means, and said partition glass support means providing support to a base of said partition glass, said lower edge portion and said partition glass support means, said partition glass support means extending under said partition glass, said single sheet metal material having a second bend on an opposite side of said partition glass support means from said first bend, said second bend forming a second upper portion in said single sheet metal, said second upper portion being on an opposite side of said second bend from said partition glass support means;

an outer panel welded to said second upper portion of said single sheet metal material along said partition glass, said outer panel and said inner panel defining a clearance gap, said second location of said first upper portion being along said clearance gap;

a elevating window glass movable through said clearance gap.

11. An automobile door in accordance with claim 10, wherein:

said inner reinforcement is bent into a horizontal z-shape to form said lower portion, said first upper upright portion, said second upper upright portion and said partition glass support.

* * * * *